H. C. FORD AND H. L. TANNER.

GYROSCOPIC COMPASS FOR SHIPS.

APPLICATION FILED DEC. 5, 1919.

Reissued Mar. 29, 1921. 15,072.

INVENTORS
HANNIBAL C. FORD AND
HARRY L. TANNER.
BY
Herbert H. Thompson
THEIR ATTORNEY

UNITED STATES PATENT OFFICE.

HANNIBAL C. FORD, OF JAMAICA, AND HARRY L. TANNER, OF BROOKLYN, NEW YORK, ASSIGNORS TO SPERRY GYROSCOPE COMPANY, OF BROOKLYN, NEW YORK.

GYROSCOPIC COMPASS FOR SHIPS.

15,072. Specification of Reissued Letters Patent. Reissued Mar. 29, 1921.

Original No. 1,273,759, dated July 23, 1918, Serial No. 106,121, filed June 27, 1916. Application for reissue filed December 5, 1919. Serial No. 342,825.

*To all whom it may concern:*

Be it known that we, HANNIBAL C. FORD and HARRY L. TANNER, citizens of the United States, residing at Jamaica, L. I., and Brooklyn, New York, respectively, in the counties of Queens and Kings, respectively, and State of New York, have invented certain new and useful Improvements in Gyroscopic Compasses for Ships, of which the following is a specification.

This invention relates to gyroscopic compasses and has for its object to provide a simple, practical gyro-compass of large effective directive power especially suited for the navigation of ships or similar moving vehicles.

Furthermore, this invention consists in safeguarding the operation of the gyro-compass against disturbances such as oscillations, acceleration pressures, motions, etc., received from the ship, by providing such compass with suitable damping, ballistic, compensating and stabilizing factors.

Some of the general problems which are overcome by this invention and the broad principles of operation of this invention are set forth in our joint patent for improvements in gyroscopic compasses and methods of controlling the same, No. 1,273,799, July 23, 1918, of which the present application is a continuation, containing for the most part matter divided from the application for said patent.

Figure 1:
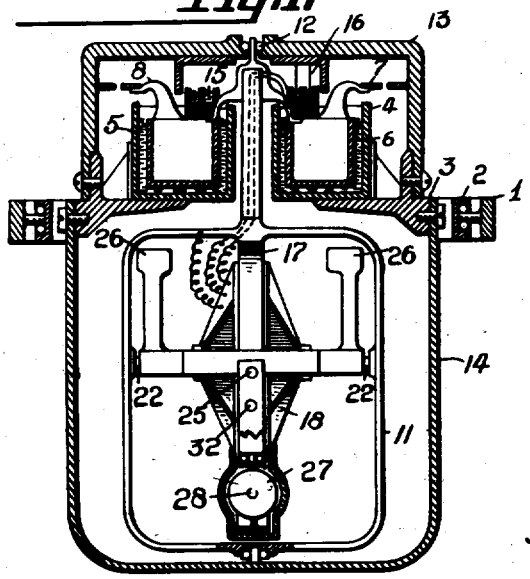
Figure 3:
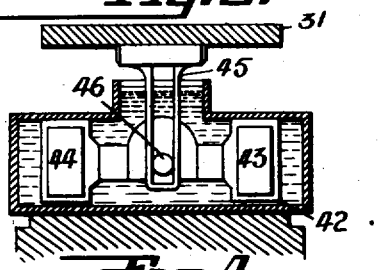
Figure 4:
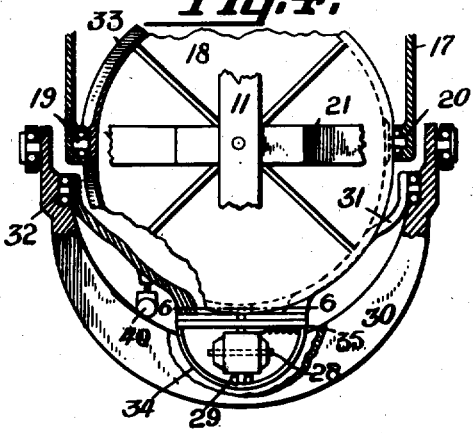
Figure 2:
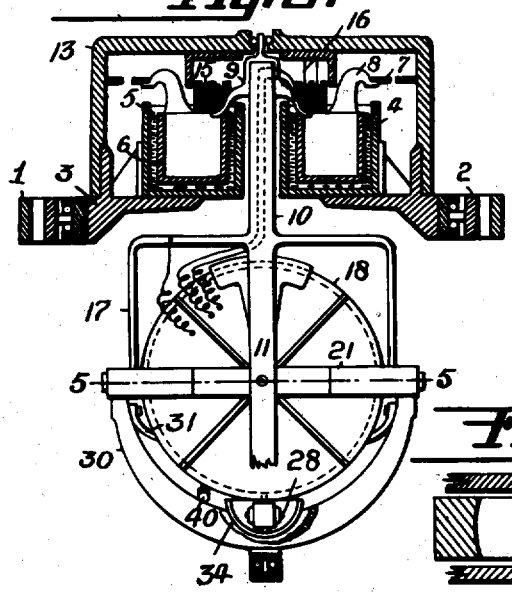
Figure 5:
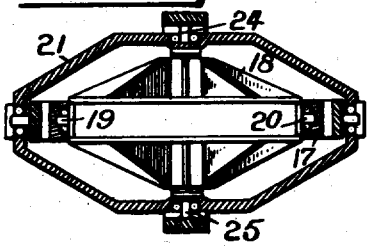
Figure 6:
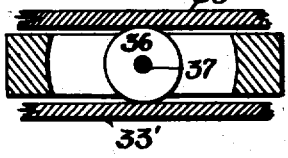
Figure 7:
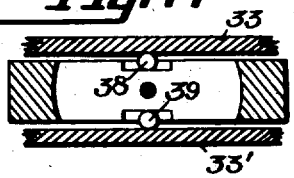

Referring to the drawings in which like reference characters denote like parts throughout, Figure 1 is an end elevation partly in section of a gyro-compass constructed according to this invention. Fig. 2 is a side elevation thereof. Fig. 3 is an enlarged view of the dash pot which connects two portions of the bail. Fig. 4 is an enlarged side elevation partly in section of the compass casing and the bail, showing in detail the supporting means for the parts. Fig. 5 is a section on line 5—5 of Fig. 2. Fig. 6 is an enlarged detail, being a section taken on line 6—6, Fig. 4. Fig. 7 is a corresponding view to Fig. 6 of a modified form of coupling.

As explained in our aforesaid application, one of the main objects of this invention is to eliminate deviations of the compass due to rolling and pitching of the ship without providing a cumbersome stabilizing means for all parts of the compass. In the particular embodiment illustrated, this idea is shown as applied to a compass supported on a mercury float, although it will be understood that the broad principles herein outlined and claimed may be applied to any other type of suspension. The compass is shown as supported in the usual gimbal rings 1 and 2; the ring 2 serving to support the member 3 within which is mounted the receptacle 4 for the mercury 5. A circular float 6 is supported by the mercury 5 and carries the entire azimuth movable unit. This comprises the compass card 7 shown as supported by means of brackets 8 from the float and brackets 9 which support the central stem 10. The said stem is attached adjacent its lower end to an open frame 11 and is journaled adjacent its top 12 within a spider 13 attached to support 3. The frame work 11 is journaled near its base in an outer frame 14 also attached to frame 3 so that lateral oscillations of the compass within the mercury are prevented. The float 6 is also shown as carrying suitable annular rings 15 of mercury in which fingers 16 dip, whereby current is led into the gyroscope. The open frame work 11 is provided with a pair of downwardly extending arms 17 in which the rotor bearing casing 18 is journaled on horizontal pivots 19, 20. The pivots are preferably positioned at, or near, the center of gravity of the casing, and a pendulum relied upon to impart more or less ballistic properties thereto and to form a yielding connection between the casing and frame 11. In other words, the compass casing is not sufficiently pendulous to give the compass a sufficiently short period about the meridian without the employment of other pendulous means or its equivalent. The preferred period of oscillation about the meridian for this type of compass is in the vicinity of 85 minutes. The entire frame 11, together with all supported parts, is, of course, pendulously suspended from float 6—the whole compass having its center of gravity below the pivots of the gimbal rings 1 and 2. Said pendulum 30 is preferably so constructed as to have freedom of movement with respect to the casing about or in the east-west plane, that is, in the plane of the rotor, and is so designed as to have a very long period of oscillation in this plane. It is well known that a single gyroscope will stabilize itself in all planes except in the plane of the rotor or parallel thereto, so that an unstabilized gyro-compass is free to oscillate in the east-west plane. As explained in our aforesaid application, we do not attempt to stabilize the entire gyroscope, but may merely stabilize a portion of the gyroscopic system by which means the point of application of a portion at least of the pendulosity is stabilized. For this purpose we prefer to universally support the pendulum so that it may oscillate in both planes. A horizontal ring 21 is pivoted within frame 11 on pivots 22, 22′ and the pendulum is pivotally suspended from said ring on pivots 24, 25 placed at right angles to pivots 22, 22′. For increasing the period of the pendulum in the east-west plane compensating weights 26, 26′ are shown secured to ring 21 above axis 22, 22′ so that about said axis the pendulum is converted into a compound pendulum.

We also prefer to provide a stabilizing gyroscope 27, mounted within the pendulum in such a manner as to oppose such oscillations. A convenient mounting is shown in the figures in which the gyroscope is supported on a horizontal spinning axis 28 for freedom about a vertical axis 29 within the frame 34. For centralizing the gyroscope within the pendulum a small tension spring 35 may be provided.

While we are aware that broadly it is old to provide an auxiliary gyroscope on a gyroscopic compass but by mounting the stabilizing gyroscope for independent precession with respect to the part to be stabilized, we are enabled to employ a much smaller stabilizing gyroscope than would otherwise be necessary. Also the necessary size of the stabilizing gyroscope is further reduced by our stabilization of a portion only of the suspended gyro-unit or its associated parts.

For reasons hereinafter explained we prefer to construct the pendulum in two parts of 30 and 31, the inner part 31 being pivoted at 32 to the outer part. The inner part lies, in the main, between the two flanges 33, 33′, on the rotor casing 18. The said part 31 supports the frame 34 for the gyroscope 27. The connection between the pendulum and the rotor casing comprises a roller 36 or other antifriction means, connected preferably to the vertical shaft 37 supporting the gyro casing and rolling between the two flanges 33 and 33′ on the gyro casing. (See Fig. 6.) For damping this form of compass, we prefer to employ means operating directly about the horizontal axes. A yielding motion resisting connection between the pendulum or a portion thereof and the gyro casing is employed for this purpose, this connection preferably being placed between the auxiliary pendulum 31 above described and pendulum 30. More specifically the two pendulums are connected by means of a yielding dashpot 40 which is so constructed as to allow only extremely slow movement even under heavy pressure. Under these conditions it will be seen that the two parts of the pendulum act as a unit for all short oscillations. If the oscillations have extremely long periods it will allow the pendulums to move with reference to one another, constituting an effective means for damping long period oscillations by applying forces directly about the horizontal supporting axis 19, 20 of the casing 18. This dash pot is illustrated in detail in Fig. 3, and consists of a casing 41 secured to the outer pendulum 30 and designed to hold oil or like substance within which is submerged a double piston 42. Each end of the piston is preferably hollow, as shown at 43, 44 so that the specific gravity of the piston is unity with reference to the submerging oil. A slotted stem 45 which engages over the pin 46 on the piston serves to connect the piston with the auxiliary pendulum 31.

The weights 26, 26′ also serve to equalize the moments of inertia of the suspended portions of the apparatus about the two principal horizontal axes. To secure efficiency in a gyro-wheel it is advisable to design it so that it has considerably greater dimensions diametrically than axially. It is also found necessary to make the inclosing casing conform more or less closely to the proportions of the rotor, both in order to dissipate the heat properly and to avoid unnecessary weight. Other parts, including the bail 30, are necessarily proportioned accordingly. By the laws of mechanics, if such an unbalanced body is suspended and oscillated like a pendulum in any plane but a plane parallel to its principal axis, a torque will be exerted on the body tending to turn it into such a plane and causing it to oscillate until it comes to rest in the plane. As applied to a compass, it will at once be seen that such an effect is very undesirable, since it would cause serious deviations if the compass were oscillated about the Cardan supports in any plane but the plane of the rotor. Weights 26, 26′ positioned beyond the general outlines of the disk-shaped casing 12, furnish a ready means of overcoming this defect by equalizing the moments about both horizontal axes.

Fig. 7 shows a slightly modified form of connection between the pendulum and the casing which consists merely in replacing the single roller 36 by a couple of small steel balls, 38, 39, which roll between the flanges 33, 33′ on the casing and recesses in the walls of pendulum 31.

From the above description it will be evident that we have devised a simple but effective means for preventing deviations of a gyroscopic compass due to rolling in intercardinal planes by preventing oscillations of short duration of the ballistic pendulum in the plane of the rotor. By employing the weights 26, 26′ in the manner specified and by use of the stabilizing gyroscope 27, we are enabled to give the pendulum a very long period in the plane of the rotor and at the same time retain its full ballistic properties about axis 24, 25. The damping action of the dashpot will be readily apparent, as it furnishes an effective means for absorbing the energy of the compass during oscillations.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined and the invention extends to such use.

Having described our invention, what we claim and desire to secure by Letters Patent is:—

1. In a gyro-compass, a rotor bearing frame, means for mounting said frame so as to be free about the vertical axis and for oscillation about a horizontal axis, a pendulum mounted independently of said frame, an auxiliary gyroscope connected to said pendulum, and a coupling between said pendulum and said frame.

2. In a gyro-compass, a rotor bearing frame, means for mounting said frame so as to be free about the vertical axis and for oscillation about a horizontal axis, a pendulum mounted independently of said frame, an auxiliary gyroscope connected to said pendulum, and a coupling between said pendulum and said frame, said gyroscope serving to maintain said coupling in a predetermined relation to a vertical plane through a predetermined point on the frame.

3. In a gyro-compass, a universally supported, pendulous support, a rotor bearing member pivotally supported on said support and a yielding, motion resisting, connection between said support and said member.

4. In a gyro-compass, a universally supported, pendulous support, a rotor bearing member pivotally supported on said support and a connection between said support and said member which yields to persistent pressures, but is substantially rigid against pressures or oscillations of short duration.

5. In a gyro-compass, a support, a rotor and rotor bearing casing pivotally mounted thereon on a horizontal axis at an angle to the spinning axis of the rotor, a universally supported pendulum and a coupling between said pendulum and casing.

6. In a gyro-compass, a support, a rotor and rotor bearing casing pivotally mounted thereon on a horizontal axis at an angle to the spinning axis of the rotor, a universally supported pendulum and a coupling between said pendulum and casing, which allows independent oscillation of said parts in planes parallel to the rotor.

7. In a gyro-compass, a support, a rotor and rotor bearing casing pivotally mounted thereon on a horizontal axis at an angle to the spinning axis of the rotor, a universally supported pendulum, a coupling between said pendulum and casing, which allows independent oscillation of said parts in planes parallel to the rotor and an auxiliary gyroscope for stabilizing said pendulum in such planes.

8. In a gyro-compass, a support, a rotor and rotor bearing casing pivotally mounted thereon on a horizontal axis at an angle to the spinning axis of the rotor, a universally supported pendulum, a coupling between said pendulum and casing, which allows independent oscillation of said parts in planes parallel to the rotor and means for increasing the period of the pendulum in such planes.

9. In a gyro-compass, a support, a rotor and rotor bearing casing pivotally mounted thereon on a horizontal axis at an angle to the spinning axis of the rotor, a universally supported pendulum for imparting more or less ballistic properties to the casing, about its pivotal axis, and means for increasing the period of the pendulum about the other horizontal axis.

10. In a gyro-compass, a support, a rotor and rotor bearing casing pivotally mounted thereon on a horizontal axis at an angle to the spinning axis of the rotor, a universally supported pendulum for imparting more or less ballistic properties to the casing, about its pivotal axis, and means for increasing the period of the pendulum about the other horizontal axis comprising a counter-balancing mass.

11. In a gyro-compass, a support, a rotor and rotor bearing casing pivotally mounted thereon on a horizontal axis at an angle to the spinning axis of the rotor, a universally supported pendulum for imparting more or less ballistic properties to the casing, about its pivotal axis, and means for increasing the period of the pendulum about the other horizontal axis comprising a counter-balancing mass and an auxiliary gyroscope connected therewith.

12. In a gyro-compass, a support, a rotor and rotor bearing casing pivotally mounted thereon on a horizontal axis at an angle to the spinning axis of the rotor, a pendulum for imparting more or less ballistic properties to the casing, about its pivotal axis, and means for increasing the period of the pendulum comprising an auxiliary gyroscope connected therewith.

13. In a gyro-compass, a support, a rotor and a rotor bearing casing pivotally mounted thereon on a horizontal axis at an angle to the spinning axis of the rotor, a pendulum universally pivoted thereto and a coupling between said pendulum and casing, said coupling containing a damping means.

14. In a damping device for slowly oscillating masses, the combination with a principal oscillatory mass, of an auxiliary oscillatory mass and connections between said masses including a motion resisting medium.

15. In a damping device for slowly oscillating masses, the combination with a principal oscillatory mass, of an auxiliary oscillatory mass having a different natural period, and connections between said masses including a motion resisting medium.

16. In a damping device for slowly oscillating masses, the combination with a principal oscillatory mass, of an auxiliary oscillatory mass having a shorter natural period, and connections between said masses including a motion resisting medium.

17. In a gyro-compass, a rotor bearing frame, means for mounting said frame so as to be free to turn about the vertical axis and for oscillation about a horizontal axis, and means acting directly about said horizontal axis for damping the oscillations of the frame about the said vertical axis.

18. In a gyro-compass, a frame pivotally mounted about vertical axis, a rotor bearing casing pivotally mounted thereon about a horizontal axis, a pendulous device pivoted thereto about a horizontal axis, and a connection between said device and said casing containing a yielding, motion resisting member.

19. In a gyro-compass, a frame pivotally mounted about a vertical axis, a rotor bearing casing pivotally mounted thereon about a horizontal axis, a pendulous device pivoted thereto about substantially the same axis, a liquid receptacle carried by said pendulum, and a vane or plunger movable within said receptacle and connected with said casing so as to be moved by its oscillations.

20. In a gyroscopic apparatus, a rotor adapted to spin upon an axis, and having less dimensions axially than diametrically, a frame or case for said rotor conforming in its general proportions to said rotor, means for supporting said frame so as to have an axis of oscillation at an angle to said spinning axis, and a mass located beyond the general outlines of said case in the axial direction and supported by said frame supporting means.

21. In a gyro-compass, a gyro organized for three degrees of freedom, a pendulum mounted for oscillation independent of the gyro, and a dash pot for damping out oscillations, connecting said pendulum and gyro, including a piston having a specific gravity of substantially unity referred to the liquid in which piston is submerged.

22. In a gyro-compass, a gyro organized for three degrees of freedom, a pendulum mounted for oscillations independent of the gyro, and a dash pot for damping out oscillations connecting said pendulum and gyro organized for horizontal movement including a piston having a specific gravity of substantially unity referred to the liquid in which piston is submerged.

23. In a gyro compass, a support mounted for orientation, a rotor bearing frame mounted thereon for oscillation about a horizontal axis, a pendulum also mounted on said support for oscillation about both horizontal axes, and a floating connection between said pendulum and frame.

24. In a gyro compass, a support mounted for orientation, a rotor bearing frame mounted thereon for oscillation about a horizontal axis, a pendulum also mounted on said support for oscillation about both horizontal axes, a gyroscope connected thereto to increase the period thereof about one of said axes, and a floating connection between said pendulum and frame.

25. In a gyro compass, a support mounted for orientation, a rotor bearing frame mounted thereon for oscillation about a horizontal axis, a plurality of pendulums also mounted on said support for oscillation about both horizontal axes, one of said pendulums being directly connected to said frame, and a yielding, motion resisting connection between said pendulum and the other pendulum.

26. In a gyroscopic compass, a supporting frame which together with its contained parts is pendulously mounted, and a directive gyroscope and a stabilizing gyroscope supported thereby for turning about axes at an angle to each other and separate means connecting each gyroscope about said axes of turn within said frame.

27. In a gyroscopic compass, the combination with a directive gyroscope, including a pendulously supported mounting therefor in which the same is mounted on the horizontal axis, a stabilizing gyroscope mounted for precession about a vertical axis in said mounting, yielding means for centralizing the same, and a yielding connection between said mounting and said directive gyroscope.

28. In a gyroscopic compass adapted to be carried on a rocking platform, the combination of a gyroscopic directive element; a pendulous supporting means for said element adapted to turn about a vertical axis; means mounting said supporting means for oscillation about a horizontal axis; and gyroscopic stabilizing means adapted to suppress precession causing torques due to motions of said platform.

29. In a gyroscopic compass, a rotor and rotor bearing casing, a pendulously supported frame on which said casing is mounted for oscillation about a horizontal axis, means acting between said frame and casing for imparting more or less ballistic properties thereto, and a stabilizing gyroscope mounted on said frame for precession about an axis at an angle to said horizontal axis.

30. In a gyroscopic compass, a rotor bearing casing, a frame for supporting the same for oscillation about a horizontal axis and turning about a vertical axis, and masses supported by said frame and positioned on opposite sides of the casing in a north-south direction.

31. In a gyroscopic compass, a rotor, a rotor bearing casing, a supporting frame in which said casing is supported on a horizontal E-W axis, and masses supported by said frame and positioned on opposite sides of said casing in the N-S direction.

32. In a gyroscopic compass, a gimbal ring, an outer frame pivoted thereto, which together with its contained parts is pendulous, an inner support pivotally mounted about a vertical axis and supported and guided by said frame in upper and lower bearings, and a rotor and rotor bearing casing pivotally mounted about a horizontal axis within said support.

33. In a gyroscopic compass, a gimbal ring, an outer frame pivoted thereto, which together with its contained parts is pendulous, an inner frame pivotally mounted about a vertical axis and guided by said outer frame in a lower bearing, a rotor and rotor bearing casing pivotally mounted about a horizontal axis within said inner frame, and a connection between said casing and the frames for applying a torque about said horizontal axis on inclination of said casing.

34. In a gyroscopic compass, the combination with a universally supported frame, of a gyroscope, means for supporting the same in said frame for oscillation about a horizontal axis at a less distance from its center of gravity than necessary for imparting sufficient pendulosity thereto, pendulous means universally supported in said frame and connected to said gyroscope for increasing the pendulosity thereof, and a stabilizing gyroscope mounted on said means.

35. In a gyroscopic compass, a gyroscope, means for supporting the same for oscillation about a horizontal axis, pendulous means connected to said gyroscope for imparting more or less pendulosity thereto, and a stabilizing gyroscope mounted on said means.

In testimony whereof, we hereby affix our signatures:

HANNIBAL C. FORD.
HARRY L. TANNER.